Oct. 23, 1962 W. F. FELBURG ETAL 3,059,947
VENTILATED BAND CLAMP
Filed May 12, 1958 2 Sheets-Sheet 1
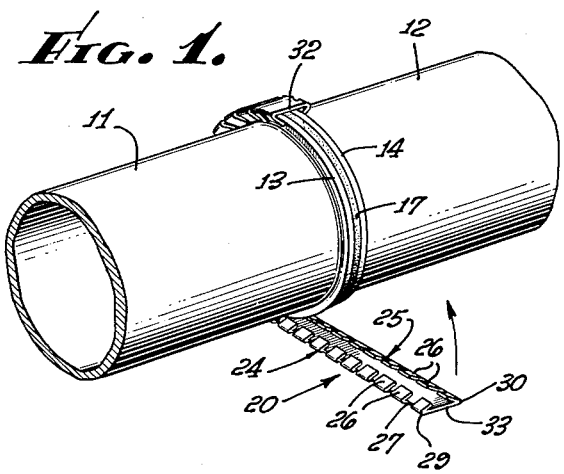
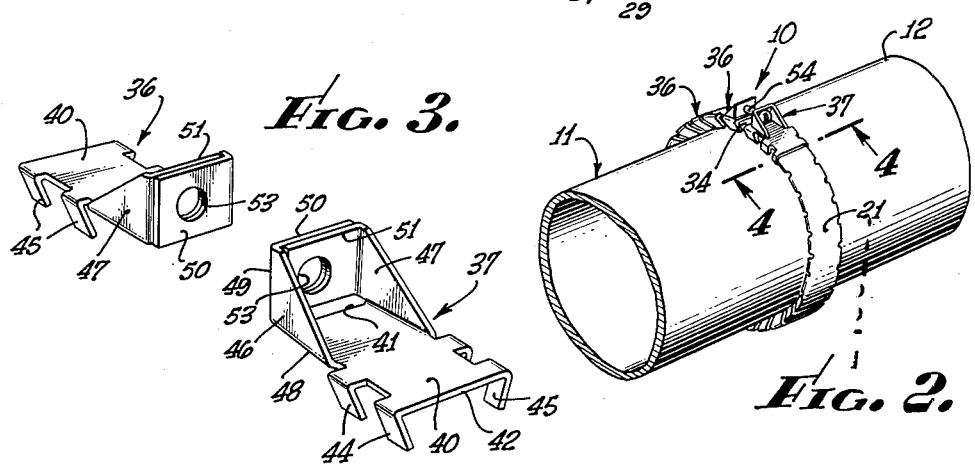
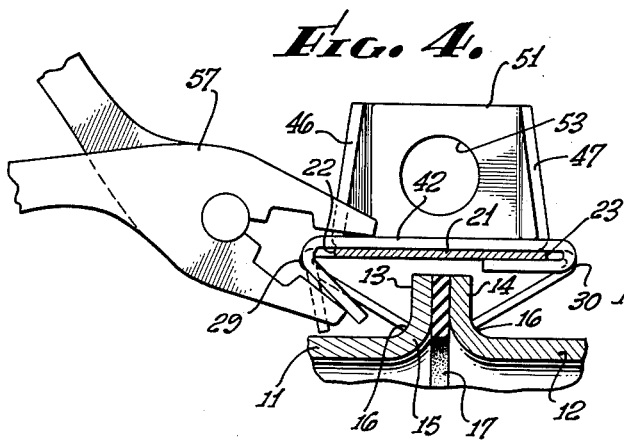
WILLIAM F. FELBURG
MARVIN G. MEUGNOIT
INVENTORS.
BY Huebner & Worrel
ATTORNEYS

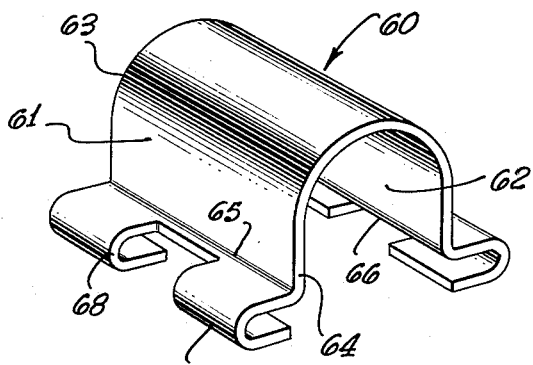
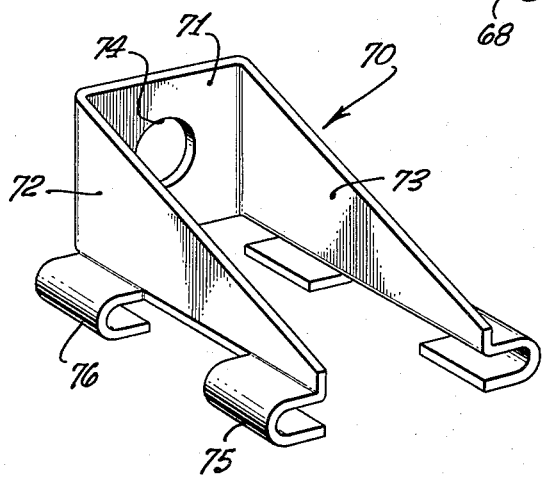
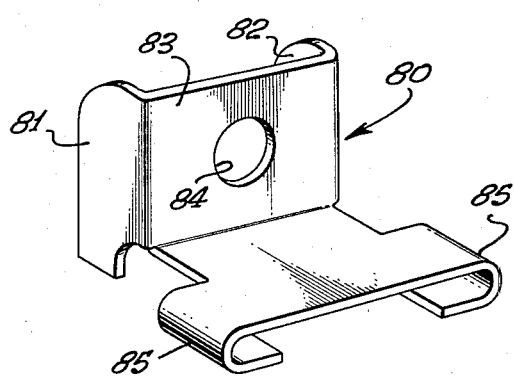
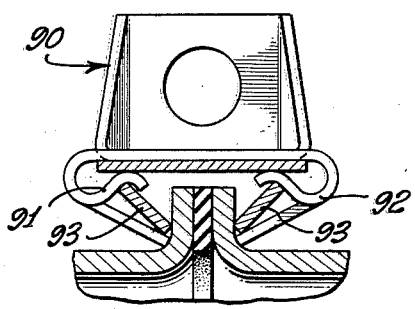
WILLIAM F. FELBURG
MARVIN G. MEUGNOIT
INVENTORS.
BY Huebner & Worrel
ATTORNEYS.

3,059,947
VENTILATED BAND CLAMP
William F. Felburg, Los Angeles, and Marvin G. Meugnoit, Santa Monica, Calif., assignors to Aeroquip Corporation, Jackson, Mich., a corporation of Michigan
Filed May 12, 1958, Ser. No. 734,506
8 Claims. (Cl. 285—410)

This invention relates to band clamps for interconnecting various types of tubular members, and more particularly to a ventilated band clamp of the general type shown in United States Letters Patent No. 2,548,216 issued April 10, 1951.

The band clamp of said letters patent has spaced apart fingers extending radially inwardly of the clamp from each side edge of a circumferentially extending web portion of the clamp, with the fingers from each side edge being bent toward those from the other side edge whereby constriction of the clamp causes the fingers to engage flanged ends of the tubular members to couple the tubular members securely in axial alignment.

Each band clamp of said patent is designed for interconnecting tubular members of a given diameter. At the place of installation of such clamps one needs to have on hand a supply of such clamps in various sizes so that a clamp will be available for fitting to the particular tubes or pipes to be coupled.

It is a general object of this invention to provide band clamp components which are adapted, through simple cutting and bending operations, to custom form a band clamp of the above mentioned character which will fit the particular pipe joint to be made, whatever may be the size of the pipe.

Further objects and advantages of this invention will appear during the course of the following part of this specification wherein the details of construction and mode of operation of several embodiments of the invention are described with reference to the accompanying drawing, in which:

FIG. 1 is a perspective view of a band portion of a clamp embodying this invention, the same being shown wrapped partly around the flanged ends of two pipe sections;

FIG. 2 is a perspective view showing the band clamp in its completed form and in position coupling the ends of the pipe sections;

FIG. 3 is a perspective view of two spaced apart end clips for the band clamp;

FIG. 4 is an enlarged section taken through the band clamp and portions of the two pipe sections as along line 4—4 of FIG. 2, and showing a method for securing an end clip to the band portion of the clamp;

FIGS. 5, 6 and 7 are perspective views of second, third and fourth forms, respectively, of end clips of this invention; and FIG. 8 is a transverse section through the flanged portions of the two pipe sections and through an end clip of still another form for this invention.

Referring to the drawing in detail, a band clamp embodying this invention is shown therein and designated generally by reference numeral 10. It serves to couple the ends of a pair of tubular members or pipe sections 11 and 12. In the illustrated embodiments the pipe sections are provided with outwardly extending flanges 13 and 14 respectively, which are rounded at their bases 15 to provide a generally frusto-conical outer surface 16. The illustrated form of the pipe flanges is a relatively simple form and it is to be understood that the flanges may be of other designs, such as, for example, according to the different forms shown in the aforesaid letters patent. An annular gasket 17 may be positioned between the flanges 13 and 14.

The band clamp 10 comprises a band 20 which, as shown in the drawing, is designed to circumscribe the pipe flanges. It is formed preferably from a material having high tensile strength, such, as for example, ribbon steel. It is stamped out to define a central web portion 21, the side edges of which are designated by numerals 22 and 23 respectively, and two rows 24 and 25 of spaced apart fingers 26 extending from respective side edges thereof. Spaces between adjacent fingers along each side edge are designated by numeral 27. Each of the fingers along one side edge of the band strip is aligned with or axially opposed to a respective finger along the other side edge of the strip. The fingers are bent along lines 29 and 30 respectively, spaced slightly outwardly or axially from the side edges 22 and 23 of the web portion to a position at which they extend radially inwardly from the web portion at an acute angle to the web portion whereby the two rows of fingers converge toward each other. The fingers are so dimensioned and so bent with respect to the web portion as to engage the conical surfaces 16 of the flanges 13 and 14 respectively.

One end of the band is designated by numeral 32 and the other end by numeral 33. The band is cut or otherwise broken off from a longer strip or roll (not shown) of the same material to provide a length for the band 20 which will extend around the pipe flanges and provide a space 34 between the ends thereof. For interconnecting the band ends in constricting the band around the pipe flanges to couple the pipe sections together, there are two end clips for each band clamp. These clips are identical to each other and are designed to be secured to respective end portions of the band.

In the embodiment shown in FIG. 3, the end clips are designated generally by numerals 36 and 37, respectively. Each end clip comprises a base portion 40, the forward and rearward end edges of which are indicated at 41 and 42, respectively. Such end clip is formed as by stamping from a sheet of metal to provide ears 44 along one side edge of the base and ears 45 along the other side edge and two brace and end wall forming portions 46 and 47, said portions being disposed forwardly of the ears. The portion 46 is bent upwardly from the base portion along a line 48 and bent again along a line 49 extending vertically from one forward corner of the base portion to provide an end wall flap portion 50. The portion 47 is bent similarly as the portion 46 and its end wall flap 51 and the flap 50 are overlapped to form the end wall of the clip while the portions disposed between the bend lines 48 and 49 constitute braces for the end wall. These brace portions converge toward each other forwardly of the clip.

The end wall (flaps 50 and 51) constitutes a flange on the clip by which the band ends may be interconnected when the clips are secured to the end portions of the band. There is a hole 53 formed to extend through each end flange. They serve to accommodate the shank of a bolt 54 having a head on one end thereof and a screw-threaded nut on its other end whereby when the bolt is positioned to extend through the holes 53 of the flanges of the two end clips, it may be tightened to constrict the band around the pipe flanges.

The ears 44 and 45 of the clips are of a width such that they may be received in the spaces 27 between the fingers 26 of the band. In the embodiment of FIG. 3 there are two ears along each side edge of each clip. As best shown in FIG. 4, the ears are bent radially inwardly with respect to the band clamp, as with a pair of pliers 57 in the direction from the dotted line position 58 shown in FIG. 4 to a position where they lie flush against the inside surface of the web portion 21 of the band as is shown in the right hand side of FIG. 4.

Another form of end clip is shown in FIG. 5, the same being designated generally by reference numeral 60. It is formed from a strip of metal bent to provide a saddle portion 61 which is U-shaped in cross section and has a central passage 62 extending therethrough from end edge or wall 63 thereof to the end edge 64 thereof for accommodating a fastening bolt 54 for tightening the band. The base of the clip 60 is formed by bending the strip outwardly as along lines 65 and 66 respectively. The clip 60 has two ears 67 and 68 along each side thereof for securing the clip upon an end portion of the band with the ears being extended through respective spaces between the fingers of the ventilated band.

In FIG. 6 there is shown an end clip 70 having an end wall 71, side braces 72 and 73, a hole 74 in the end wall 71 for receiving a fastening bolt 54, and each side brace having a pair of ears 75 and 76 for engaging a ventilated band in respective spaces between fingers of the band.

In FIG. 7 another form of clip is shown, the same being designated generally by reference numeral 80. In this embodiment there are side braces 81 and 82 extending forwardly of an end wall 83 having a bolt receiving hole 84. Also in this embodiment there is only one ear 85 on each side of the clip for engaging in respective spaces between adjacent fingers of a ventilated band. The side braces 81 and 82 are so formed that the bottom edges thereof will engage the upper surface of the web portion of the band thereby to maintain the end wall of a clip in its radially outwardly extended position against being bent inwardly of the band when tightened as with a bolt 54.

In FIG. 8 an end clip 90 is shown, the same being of the type shown in FIG. 3. In the embodiment of FIG. 8 the ears 91 and 92 of the clips are curved outwardly so that when the clip is secured to a band as shown, a bar 93 may be inserted between a flange of the pipe sections and an ear thus to maintain the ear against being bent outwardly away from the underside of the web portion of the band.

As thus described, it is seen that by this invention there is provided a band clamp which can be cut at the place where it is intended to be installed and to the size thereof which will fit properly around the particular pipe flanges which it is desired to couple. As pipes of various sizes are encountered in practice, one may quickly and easily install the band clamps by having with him a long length of the band portion of the clamp along with a supply of the end clips with which he may form a coupling clamp of a proper size to fit the particular pipes to be coupled.

While the instant invention has been shown and described herein, in what are conceived to be the most practical and preferred embodiments, it is recognized that departures may be made therefrom within the scope of the invention, which is therefore not to be limited to the details disclosed herein, but is to be accorded the full scope of the claims.

What we claim is:

1. Means for forming a band clamp to couple adjacent ends of a pair of tubular members, said members having outwardly extending flanges at said ends, the remote side wall surfaces of the flanges being at least partly frusto-conical in configuration, said means comprising an elongate strip adapted to be cut to provide a band of a length sufficient to encircle said flanges, said strip having a plurality of uniformly spaced apart fingers converging inwardly with respect to the axis of said tubular members from respective sides of said strip for engaging said frusto-conical surfaces, a pair of clips adapted to be secured to the end portions respectively of said band, said clips having ears extending from each side thereof and adapted to be bent to extend through a space between adjacent fingers on the band, each of said clips having an end wall, and means for drawing said end walls of the clips toward each other.

2. A ventilated band clamp for coupling the flanged ends of two axially aligned tubular members, said clamp comprising an annular band having two end portions, the band being adapted to circumscribe said end flanges with a small space being present between the ends of the band, the band having a circumferential web portion and a plurality of uniformly spaced apart fingers converging inwardly of the band from respective sides of the web portion to engage the remote side wall surfaces respectively of said end flanges, a pair of clips upon one surface of the web portion of the band respectively, each clip being separate from said band and comprising a body having side portions longitudinally arranged relative to the band, said side portions of each clip being engageable against said surface of the web portion of the band adjacent the side edges of the band in the region of a respective end portion of the band, each clip having a transverse end wall integrally connected to the body of said clip and projecting radially outwardly of the band proximate the respective end of the band, and an ear extending outwardly from each side portion of the clip, said ears being extended through respective spaces between adjacent fingers of the band and bent against the other surface of said web portion, and means engageable with said end walls for drawing said end walls of the clips toward each other to constrict the band around the flanges.

3. A band clamp according to claim 2 in which said clips each include braces extending radially-outwardly from said side portions of the clip and integral with the end wall thereof.

4. A band clamp according to claim 2 in which each clip has a pair of ears along each side thereof, and the ears are of a width just slightly less than that of the spaces between said fingers.

5. A band clamp according to clamp 2 in which said clips include side braces extending from the end wall toward the respective band ends and engaging the band web portion for maintaining the end wall from being bent radially inwardly of the band.

6. A band clamp according to claim 2 in which said clips are disposed upon the outside surface of the web portion of the band and the ears of the clips are bent inwardly toward the under surface of the web portion.

7. A band clamp according to claim 6 wherein said ears are bent at their free ends inwardly away from the under surface of the web portion, and including two strips of rigid material wedged between said ears and said end flanges, respectively.

8. A ventilated band clamp for coupling the flanged ends of two axially aligned tubular members, said clamp comprising an annular band having two end portions, the band being adapted to circumscribe said end flanges with a small space being present between the ends of the band, the band having a circumferential web portion and a plurality of uniformly spaced apart fingers converging inwardly of the band from respective sides of the web portion to engage the remote side wall surfaces respectively of said end flanges, a pair of clips upon one surface of the web portion of the band respectively, each clip being separate from said band and comprising a body having side portions longitudinally arranged relative to the band, said side portions of each clip being engageable against said surface of the web portion of the band adjacent the side edges of the band in the region of a respective end portion of the band, each of said clips has a saddle portion which is U-shaped in cross section for receiving band constricting means, said saddle portion extending from one side portion of the clip to the other and being radially-outwardly bowed between the side portions of the clip, and an ear extending outwardly from each side portion of the clip, said ears being extended through respective spaces between adjacent fingers of the band and bent against the other surface of said web portion, and means engageable with said end walls for drawing said end walls of the clips toward each other to constrict the band around the flanges.

References Cited in the file of this patent

UNITED STATES PATENTS

| | | |
|---|---|---|
| 382,793 | Bloomberg | May 15, 1888 |
| 501,772 | Doty | July 18, 1893 |
| 759,255 | Ferguson | May 10, 1904 |
| 1,262,413 | Tyler | Apr. 9, 1918 |
| 1,274,688 | Cooper | Aug. 8, 1918 |
| 1,942,600 | Hornung | Jan. 9, 1934 |
| 2,339,759 | Bidwell | Jan. 25, 1944 |
| 2,352,971 | Prochaska | July 4, 1944 |
| 2,548,216 | Houghton | Apr. 10, 1951 |
| 2,651,094 | Dodge | Sept. 8, 1953 |
| 2,835,954 | Dahl | May 27, 1958 |

FOREIGN PATENTS

| | | |
|---|---|---|
| 251,728 | Great Britain | May 13, 1926 |
| 730,415 | Great Britain | May 25, 1955 |